July 28, 1959  J. R. GREEN  2,896,398
COTTON HARVESTER
Filed Nov. 15, 1957  5 Sheets-Sheet 1

James R. Green
INVENTOR.

BY *Clarence A. O'Brien*
and *Harvey B. Jacobson*
Attorneys

James R. Green
INVENTOR.

July 28, 1959

J. R. GREEN 2,896,398

COTTON HARVESTER

Filed Nov. 15, 1957

James R. Green
INVENTOR.

BY *Clarence A. O'Brien*
*and Harvey B. Jackson*
Attorneys

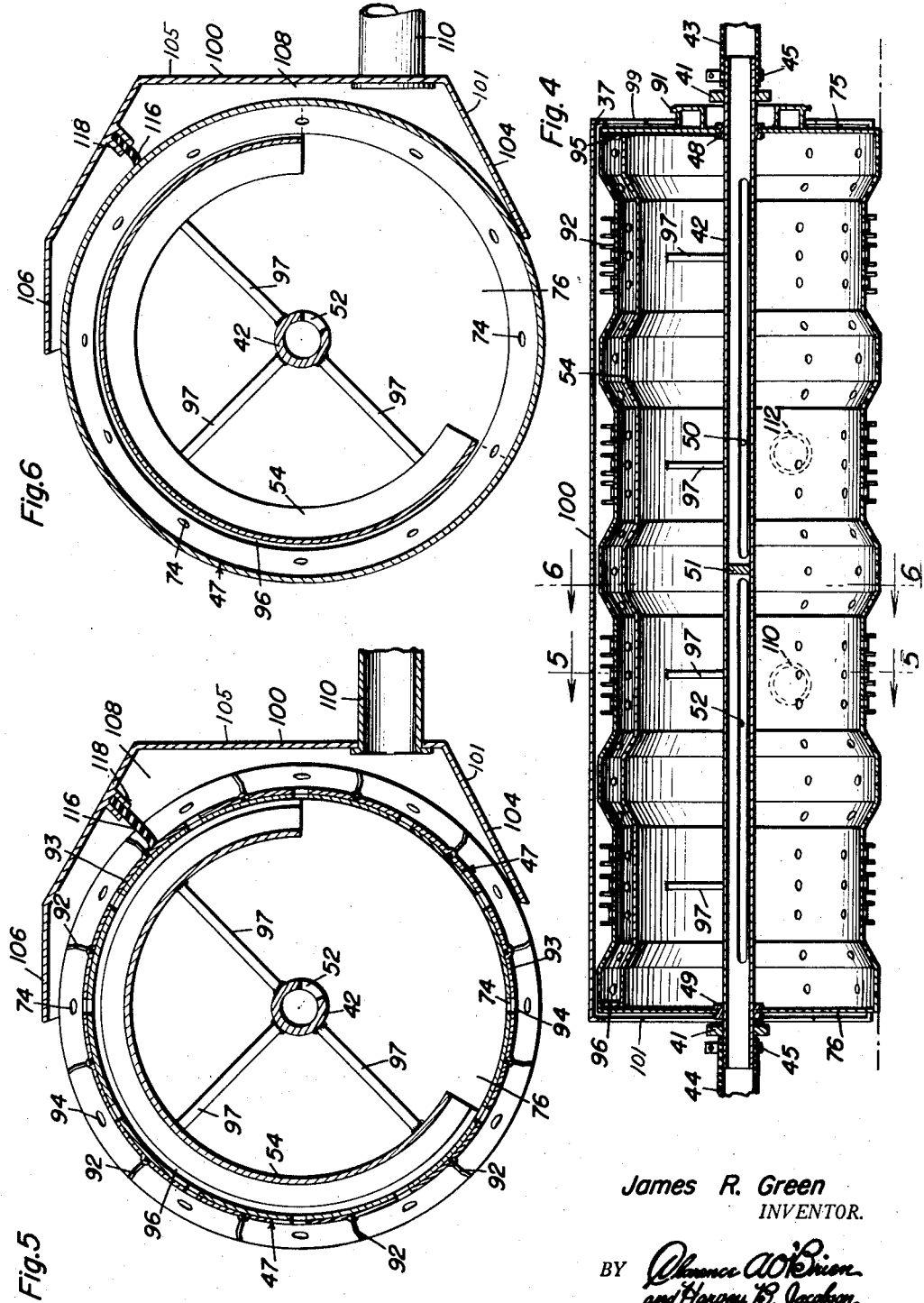

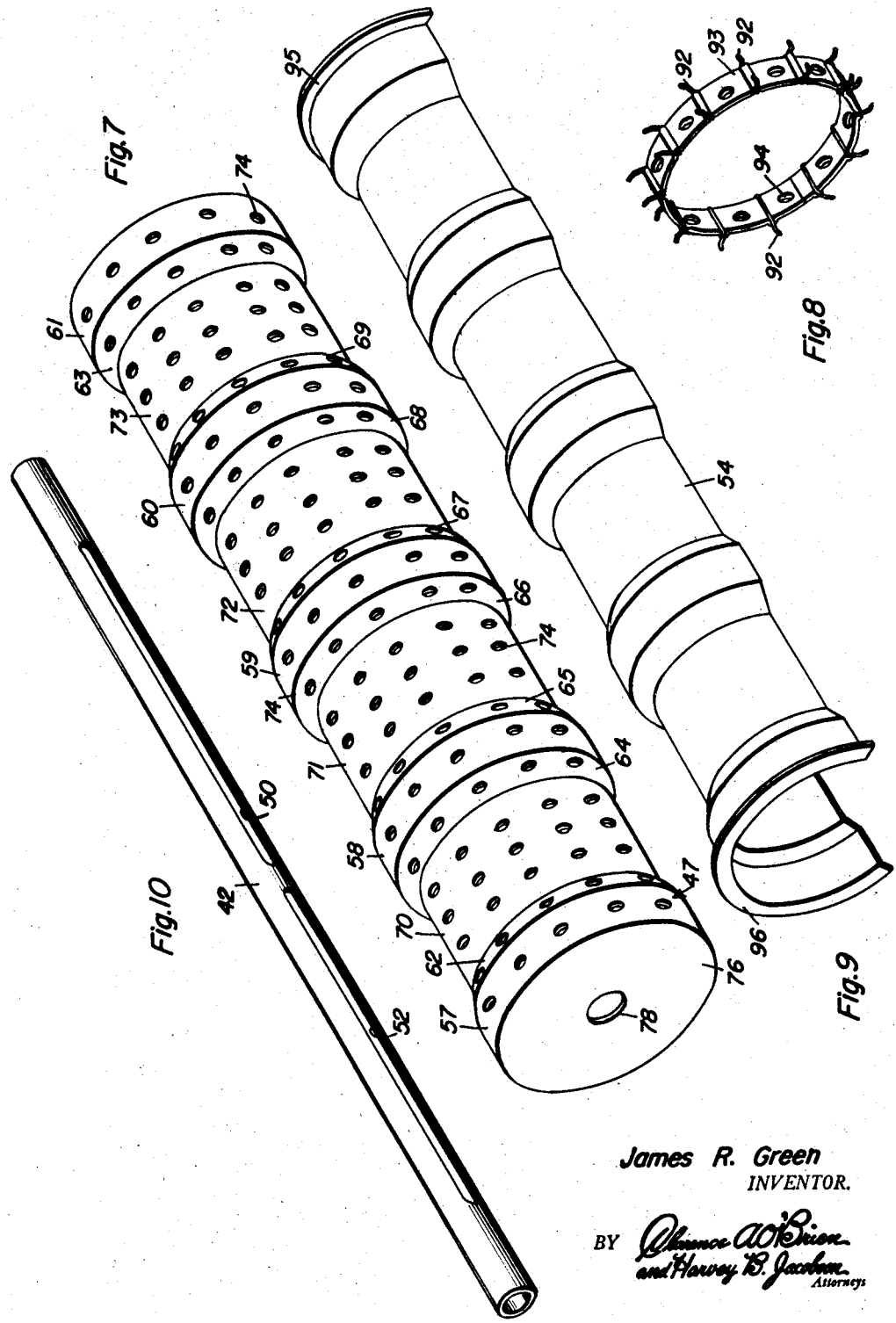

United States Patent Office 2,896,398
Patented July 28, 1959

2,896,398

COTTON HARVESTER

James R. Green, Coalinga, Calif., assignor of forty-nine percent to Frankie C. Green, Coalinga, Calif.

Application November 15, 1957, Serial No. 696,781

5 Claims. (Cl. 56—48)

This invention relates to a cotton harvester and more particularly to a pneumatically operated harvester that has a reel by which to recover cotton bolls that would ordinarily be lost when the cotton stalks are chopped.

Most cotton is harvested by mechanical cotton pickers. These pickers and the weather cause an appreciable quantity of the cotton bolls to fall to the ground. This cotton is considered as waste or loss in that any equipment to recover such cotton has, as far as I have been able to determine, been ineffective.

Wholly mechanical equipment for recovering this cotton is not satisfactorily operable because the cotton plants, after harvest, are chopped thereby leaving a field with a large number of stalks. At the time the stalks are chopped the large amount of waste cotton in a cotton field becomes very evident. At the same time, the presence of the stalks makes mechanical collection of the fallen bolls exceedingly difficult because of the interference that the stalks necessarily provide.

The principal object of the invention is to provide a pneumatically operative cotton harvester for gathering cotton bolls that fall to the ground or that remain on the stalks after conventional cotton harvesters have covered the area and the stalks have been chopped.

A further object of the invention is to provide a cotton harvester that has a picker reel of special construction. Although it is not essential, I prefer to use the conventional cotton harvester after removing the picker heads. This leaves available the main frame of the harvester, the blowers, the basket, the cleaning grates at the top of the basket, the hydraulic means operated from the driver's seat to raise and lower the basket for dumping the cotton onto a trailer or truck and many other structural parts that are necessary or at least desirable, in the construction of my harvester.

The invention comprehends a rotary drum that has a fixed air stop or valve which breaks internal suction over a part of the surface of the drum so that the cotton bolls collected enter the drum through holes in the surface of the drum can be picked up at the ground level and by suction delivered from the drum into the tubes leading to the fans by which they are delivered to the basket. At the same time some bolls, which are too big to enter the drum, are collected from the exterior surface of the drum by suction in a hood that partially covers the surface of the drum on its outside. The air stop is effective to blank a portion of the drum surface within the hood and this aids in the extraction of the bolls from the outside surface of the drum. A wiper in the hood and adapted to contact the surface of the drum, forms a suction barrier and also wipes the drum surface to assure that the surface adhering bolls are extracted and delivered into the cotton basket.

One of the features of the invention is the structure of the cotton harvester picker reel and its suction controlling parts. These include the internal air stop that is mounted on a suction tube at the axis of drum rotation, the configuration of the drum itself with the surface arranged to straddle two or more rows of cotton, the suction hood enclosing a part of the interior surface of the drum, plus the small spring fingers which impale some of the cotton. These fingers can be attached to the drum in many ways and can be staggered in a pattern to provide most effective ground coverage. Their presence enables my cotton picker reel to gather cotton not only by suction but also by mechanical collection.

The principles of the invention can be practiced with my cotton harvester picker reel used as original equipment so that the harvester is a machine to be used subsequent to a conventional harvester. It is more economically feasible to practice the principles of my invention in a cotton harvester picker reel which functions as either an attachment for an ordinary harvester or as an attachment which will be a substitute for the picker head or heads of the conventional harvester.

Other objects and features of importance will become apparent in following the description of the illustrated form of the invention.

Figure 4 is a sectional view taken through the reel and taken on the line 4—4 of Figure 3.

Figure 5 is an enlarged transverse sectional view through the reel and taken on the line 5—5 of Figure 4.

Figure 6 is an enlarged sectional view taken on the line 6—6 of Figure 4.

Figure 7 is a perspective view of a rotating drum which is a part of the reel of Figure 4.

Figure 8 is a perspective view of a spring finger supporting band used on the surface of the drum.

Figure 9 is a perspective view of the air stop which fits in the drum of Figure 7 and which constitutes a part of the reel in Figure 4.

Figure 10 is a perspective view of the center air tube that functions as an axle for the reel of Figure 4.

In the accompanying drawings there is a tractor 10 on which cotton harvester 12 is fastened. The general configuration of harvester 12 can be recognized by those familiar with cotton growing, as one manufacturer's make that is altered in accordance with the invention. It is emphasized that the principles of the invention are not only applicable to this particular make of harvester but to any other manufacturer's make with practically no alteration between attachments for different makes of harvesters.

Figure 2:
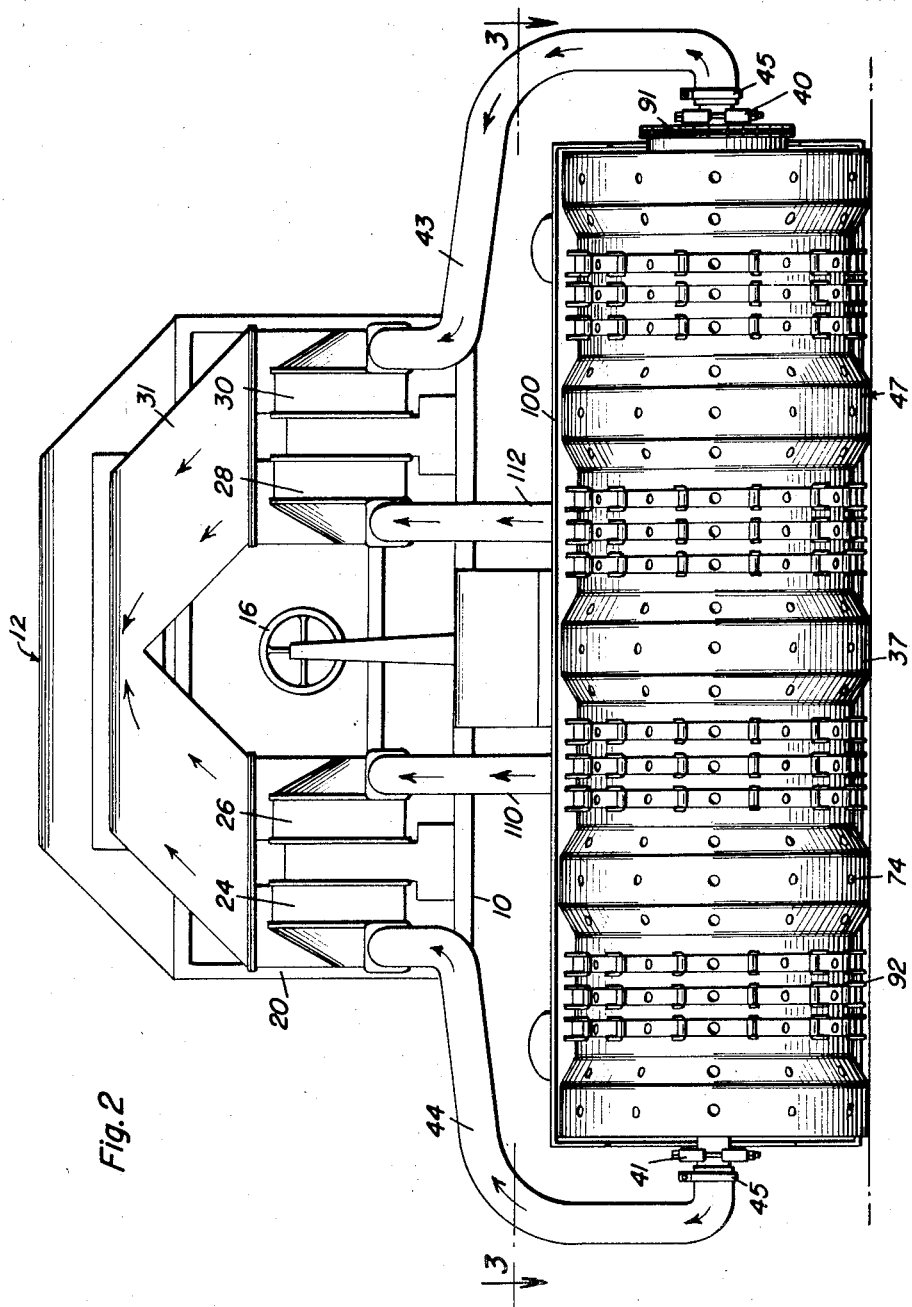
Figure 2 is a front view of the harvester of Figure 1.

As is common, the tractor 10 is operated in reverse with the frame 14 of the harvester 12 furnished with a rearwardly facing steering wheel 16 (with reference to the front of the tractor) and a seat 18 near the steering wheel. The other controls for the harvester are near seat 18. The standard equipment of the harvester and equipment which is common to all manufacturers' makes of which I am aware, includes basket 20, means, usually hydraulic, for dumping the basket, an air bonnet 22 within which there are cleaning grates and a bank of four blowers 24, 26, 28 and 30 which feed cotton through the outlets into manifold 31 which registers with the bonnet 22. The manufacturers' makes of cotton harvesters have arms 33, 34, 35 and 36 connected to the frame 14 and to which the cotton picking hoods of the machine are ordinarily secured. My cotton picking reel 37 uses these arms to support the reel on the frame 14. Two split yokes 38 and 39 have their inner ends attached to these arms while the outer ends have clamps 40 and 41 that are attached to suction tube 42 extending longitudinally through and constituting a part of the reel 37. Air conduits or tubes 43 and 44 are connected by clamps 45 to the ends of tube 42, and these are operatively connected with the suction inlets of blowers 30 and 24 (Figure 2).

The suction tube 42 serves as an axle for drum 47 (Figure 7) and has spaced bearings 48 and 49 thereon for this purpose. Slots 50 and 52 are in tube 42 for the passage of air in a direction to draw the air from drum 47 plus the cotton that is suspended in the air, and deliver the cotton and air through conduits 43 and 44 to be ultimately discharged into basket 20. Central partition 51 is located between the tube slots 50 and 52 to divide the tube and the load of cotton laden air which is delivered by the blowers 24 and 30.

Drum 47 is made of a number of rings that are connected together in a manner to straddle four rows of cotton. Larger or smaller drums can be used to straddle more or less rows. Moreover, although I have illustrated the drum 47 as one piece, this may be made of a number of parts bolted, riveted or otherwise joined together. The same holds true for air stop 54 (Figure 9). There are five rings 57, 58, 59, 60 and 61 with end rings 57 and 61 having sloping rings 62 and 63 at the confronting edges thereof. The intermediate rings 58, 59 and 60 have rings 64, 65, 66, 67, 68 and 69 on opposite edges thereof and these sloping rings are joined to smaller diameter rings 70, 71, 72 and 73. The entire surface of drum 47 has apertures 74 whose outer wall portions are countersunk to more effectively guide the cotton through the holes or to more effectively seat the larger cotton bolls should they fail to pass through the apertures 74. End walls 75 and 76 of drum 47 have openings 78 through which tube 42 is passed and within which bearings 48 and 49 are located.

Figure 1:
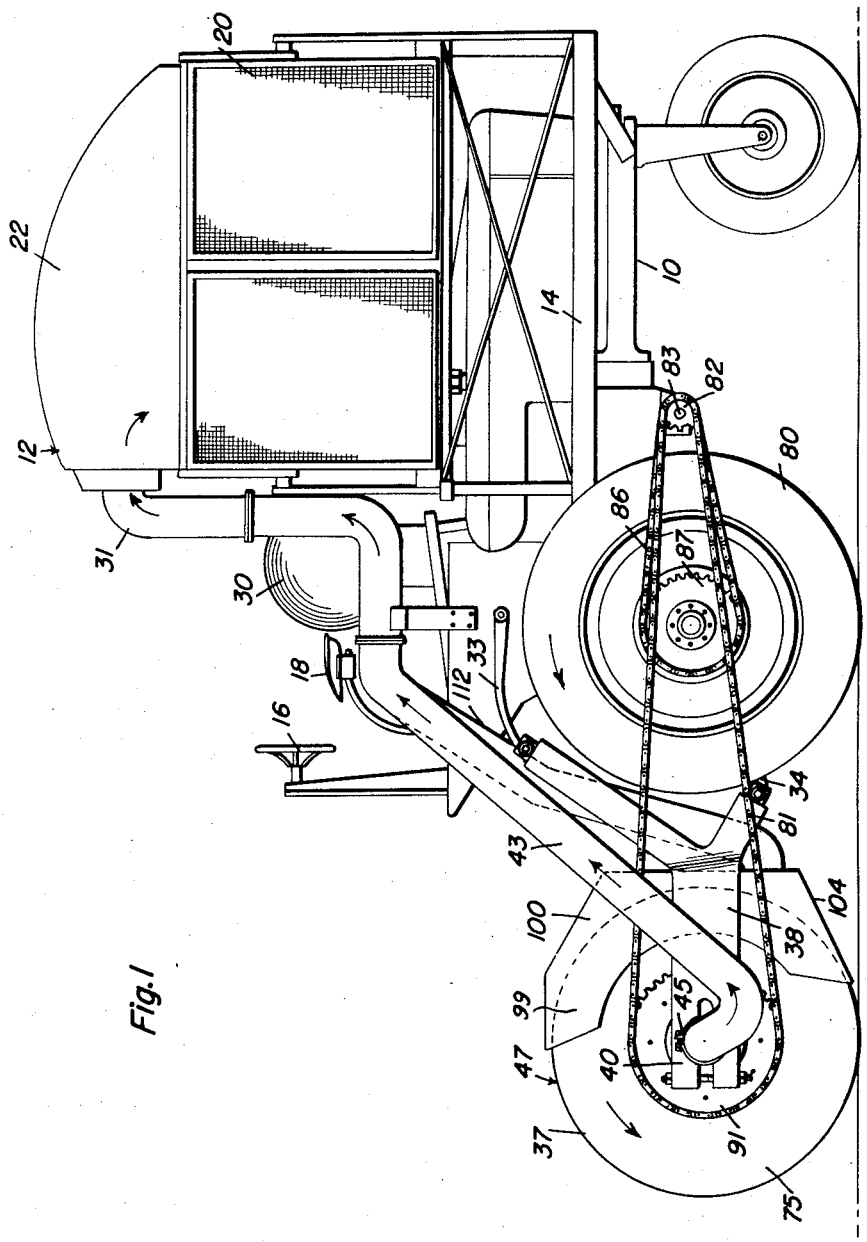
Figure 1 is a side view of a cotton harvester provided with an attachment reel constructed in accordance with the invention.
Figure 3:
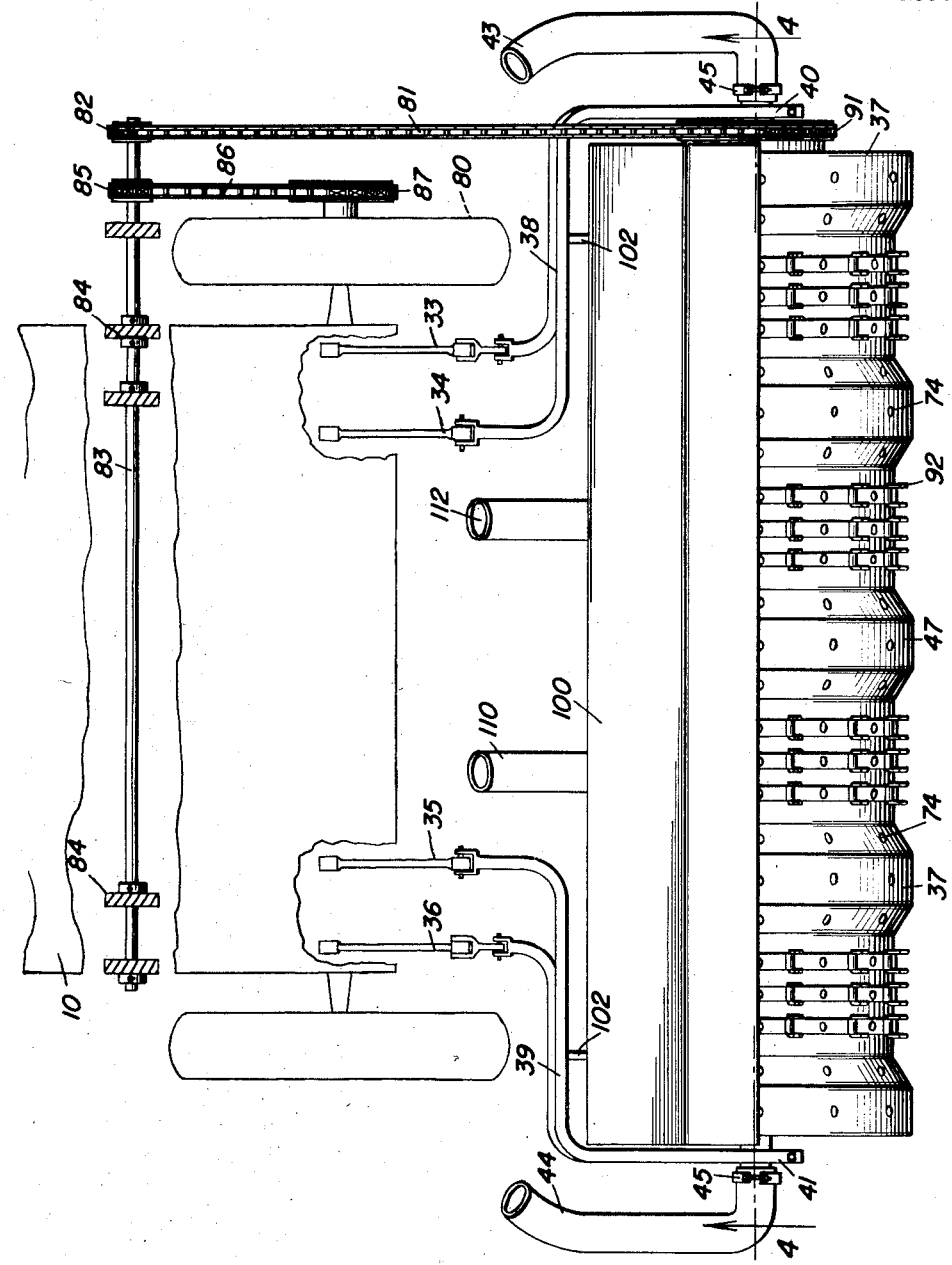
Figure 3 is a top view of my attachment with a part of the tractor and harvester on which the attachment is mounted shown diagrammatically and partly in elevation and partly in section.

Drum 47 is the only rotatable part of the reel 37. It is driven by power derived from wheel 80 of tractor 10 instead of being otherwise driven as are the heads of conventional cotton harvesters. Sprocket 91 is rigidly secured to the end wall 75 of drum 47 and it has a chain 81 entrained around it. This chain is entrained around a sprocket 82 on jack shaft 83 that is supported in bearing hangers 84. These depend from frame 14 of the harvester 12. Sprocket 85 is also attached to shaft 83 and has chain 86 enmeshed with it. This chain is engaged with sprocket 87 that is secured to the wheel 80. This construction is seen in Figures 1 and 3 and it is evident that rotation of wheel 80 will cause a corresponding rotation of the reel drum 47.

A number of impaling prongs 92 are spaced on the surface of the drum 47 between the annular ribs formed by the rings 57, 58, 59, 60 and 61. The prongs are made of steel so that they have inherent elasticity. As shown in Figure 8 the prongs may be made in U-shaped formation and held in place by bands 93 that are attached on the outer surface of the drum. The band has apertures 94 that align with apertures 74 in the drum. The band 93 is shown with pockets within which to accommodate the U-shaped prongs 92. Other construction methods for attaching prongs 92 in place could be resorted to, it being the desire that the prongs be in place as shown in Figure 4 so that the cotton bolls that are on the ground may be impaled.

Air stop 54 is an approximately three-quarter cylindrical sleeve located in drum 47. It is of the same shape as the drum but has flanges 95 and 96 at its ends which contact the edges of the inside surface of drum 47 and serve as spacers for the air stop. Supporting rods 97 are secured to the inside surface of air stop 54 and to the outside of suction tube 42. This positions the air stop rigidly within drum 47 and covers the inside surface of the top and front of the reel so that the cotton laden air drawn in through slots 50 and 52 is taken from the apertures at the bottom and rear of the reel 37 (see Figures 5 and 6).

Suction hood 100 is located behind drum 47 and covers slightly less than one-half of the surface of the drum. It is secured by brackets (Figure 3) 102 to the split yokes 38 and 39 in order to assure that it will be positioned rigidly behind the drum 47. The hood has sides 99 and 101, a top wall 106, rear wall 105 and lower wall 104. The lower wall 104 is located close to the surface of drum 47 as is the top wall 106. The hood cooperates with a part of the surface of drum 47 and closes a suction chamber 108 through which air plus cotton is drawn. In using my harvester any cotton which is small enough to fit through the apertures 74 in drum 47 which, with the aligned apertures 94, are countersunk from the outside, is passed into the drum and drawn off through suction tube 42. That cotton which is impaled by prongs 92 and which attaches itself over the apertures 94 and 74, is carried into suction chamber 108 by the normal rotation of the reel. When in suction chamber 108, the cotton is extracted by suction in chamber 108 drawn through conduits 110 and 112 that connect with the back wall of hood 100. These conduits are operatively connected with the blowers 26 and 28 and feed the cotton laden air from their discharge into basket 20. The suction in chamber 108 will react operatively and effectively on the cotton and cotton bolls that are on the impaling prongs 92 as soon as they enter the chamber 108. Some of the cotton that is suction held over the apertures 74 will be drawn from them as soon as the chamber 108 is entered. However, that cotton which remains due to the internal suction, on the drum surface will be removed when that internal suction is broken. This condition exists when the air stop 54 is reached. Assurance of complete effectiveness in the stripping of the surface of drum 47 is obtained by wiper 116 which is carried in a wiper holder 118 on the inside of hood 100. The wiper is made of flexible material, as rubber or plastic, and works on the surface of the drum in response to drum rotation. The wiper can be slotted for the prongs 92 or merely flexed to allow the prongs to pass.

It is understood that various changes and modifications may be made in this invention without departing from the scope of the following claims.

What is claimed as new is as follows:

1. An attachment to convert a cotton harvesting machine into a harvester for gathering fallen cotton bolls and cotton bolls that remain on the stalks after original harvesting, said attachment comprising a horizontal drum, means operatively connected with said drum for rotating said drum, an axle that is hollow and about which said rotating drum is operable, said axle having at least one opening in it, a source of suction connected with said axle, said drum having a substantially cylindrical wall provided with a plurality of apertures through which the cotton is adapted to be sucked for entry into said hollow axle, a hood covering a part of the exterior surface of said drum, suction producing means connected with said hood to extract surface clinging cotton from the drum, and an air stop disposed in said drum and connected to said axle, said air stop opposed to some of the apertures of said drum and arranged at least in part in operative relationship to the portion of the drum with which said hood is operable.

2. An attachment to convert a cotton harvesting machine into a harvester for gathering fallen cotton bolls and cotton bolls that remain on the stalks after original harvesting, said attachment comprising a horizontal drum, means operatively connected with said drum for rotating said drum, an axle that is hollow and about which said rotating drum is operable, said axle having at least one opening in it, a source of suction connected with said axle, said drum having a wall provided with a plurality of apertures through which the cotton is adapted to be sucked for entry into said drum and then into said hollow axle, a hood covering a part of the exterior surface of said drum, suction producing means connected with said hood to extract surface clinging cotton from the drum, an air stop for the apertures of said drum and secured to said axle and arranged at least in part in operative relationship to the portion of the drum with which said hood is operable, said air stop comprising an air stop plate concentric with said drum, and flanges on said plate spacing said air stop plate and said drum.

3. The attachment to convert a cotton harvesting machine into a harvester for gathering fallen cotton bolls and cotton bolls that remain on the stalk after original harvesting in accordance with claim 1 wherein said drum wall has spaced rings thereon to fit between rows of cotton and prongs protruding from said wall of said drum and located between said rings.

4. The attachment of claim 1 wherein there is a wiper of flexible material extending between the confronting surfaces of said drum wall and said hood respectively, and means connected with said wiper for mounting said wiper stationarily with respect to said drum.

5. The attachment of claim 1 wherein there is a wiper of flexible material extending between the confronting surfaces of said drum wall and said hood respectively, and means connected with said wiper for mounting said wiper stationarily with respect to said drum, said drum wall having a plurality of spaced rings provided with sloping sides and between which rows of cotton are adapted to fit when said drum is moved approximately horizontally over a cotton field.

References Cited in the file of this patent

UNITED STATES PATENTS

| | | |
|---|---|---|
| 858,371 | Corley | July 2, 1907 |
| 1,447,328 | Rycraft | Mar. 6, 1923 |
| 1,687,571 | Kieffer | Oct. 16, 1928 |
| 1,845,431 | Martin | Feb. 16, 1932 |
| 2,673,436 | Urban | Mar. 30, 1954 |
| 2,693,072 | Belzer et al. | Nov. 2, 1954 |